L. H. E. BÉGOT.
APPARATUS FOR STERILIZING WATER BY MEANS OF OZONE.
APPLICATION FILED AUG. 3, 1916.
1,264,360.
Patented Apr. 30, 1918.
5 SHEETS—SHEET 1.
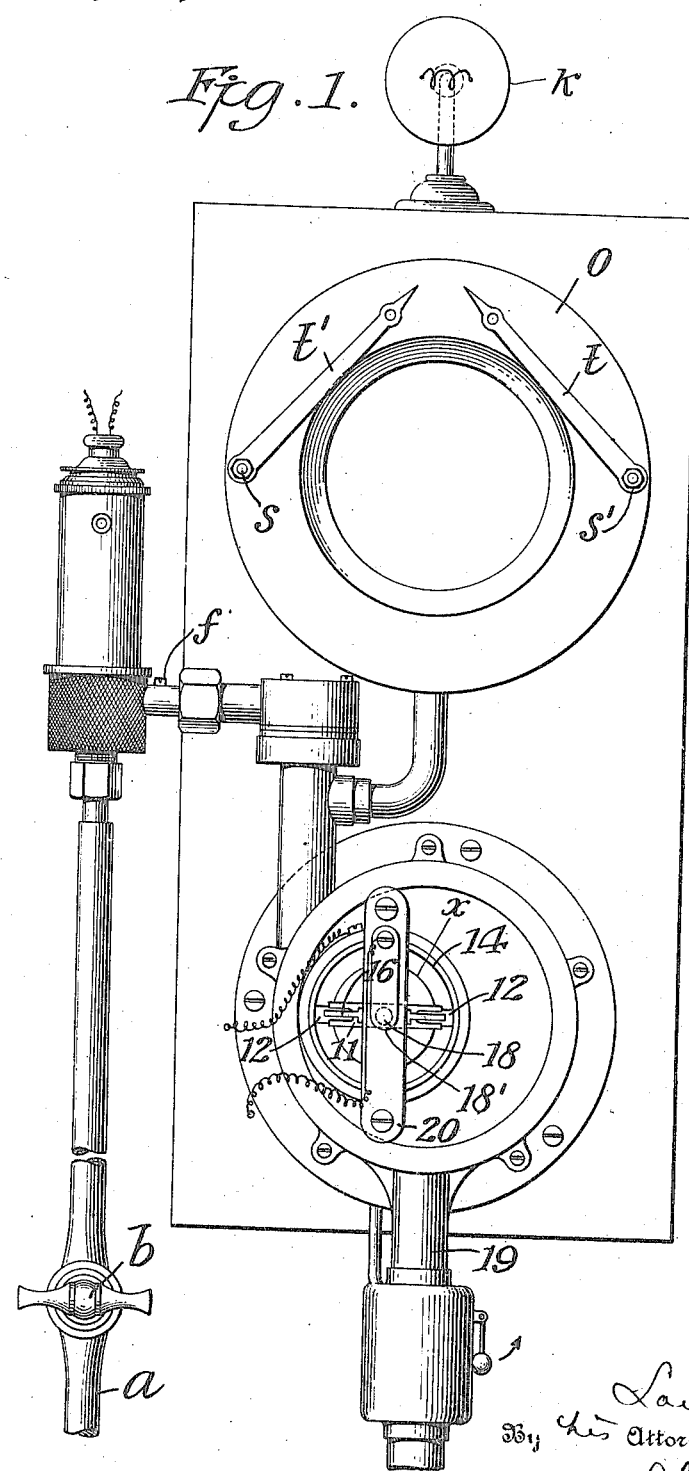
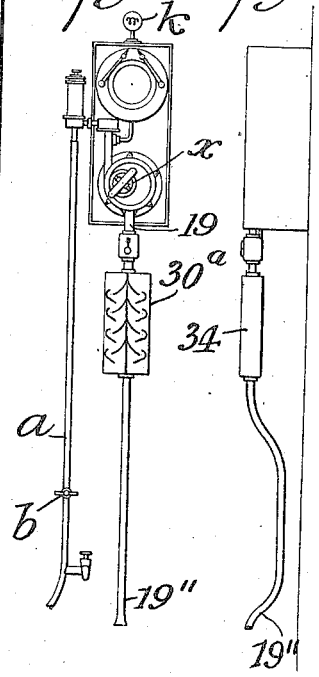

L. H. E. BÉGOT.
APPARATUS FOR STERILIZING WATER BY MEANS OF OZONE.
APPLICATION FILED AUG. 3, 1916.
1,264,360.
Patented Apr. 30, 1918.
5 SHEETS—SHEET 2.
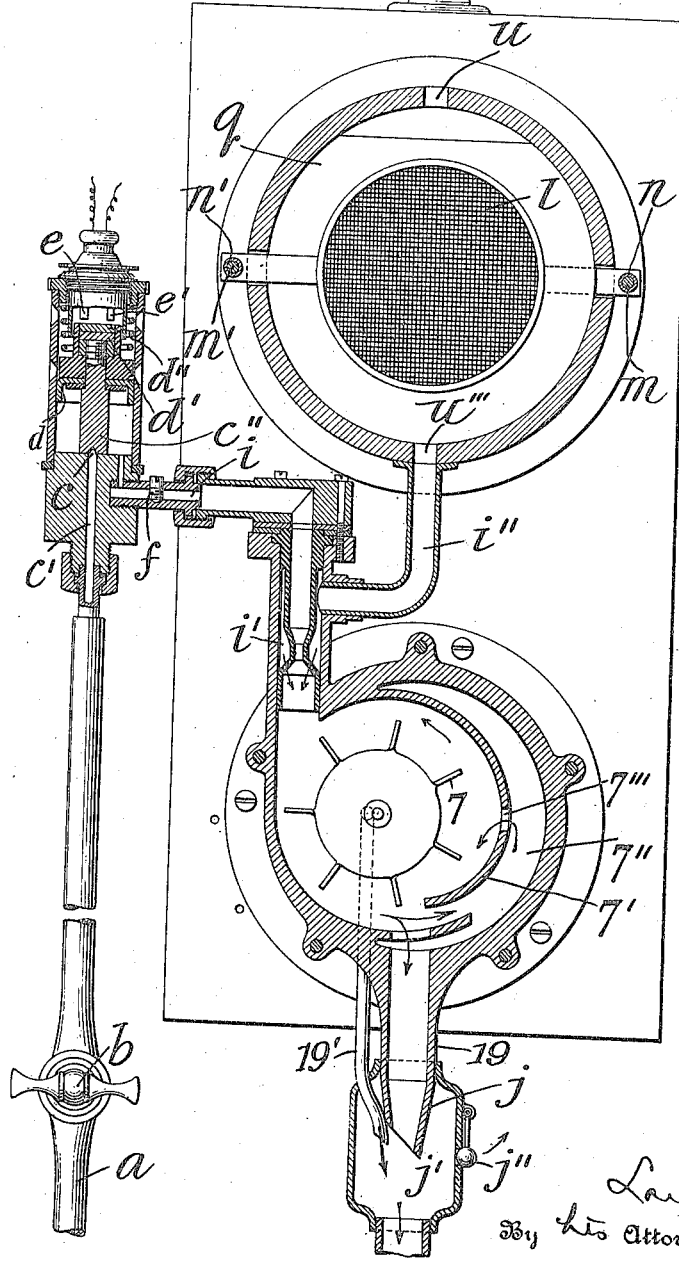
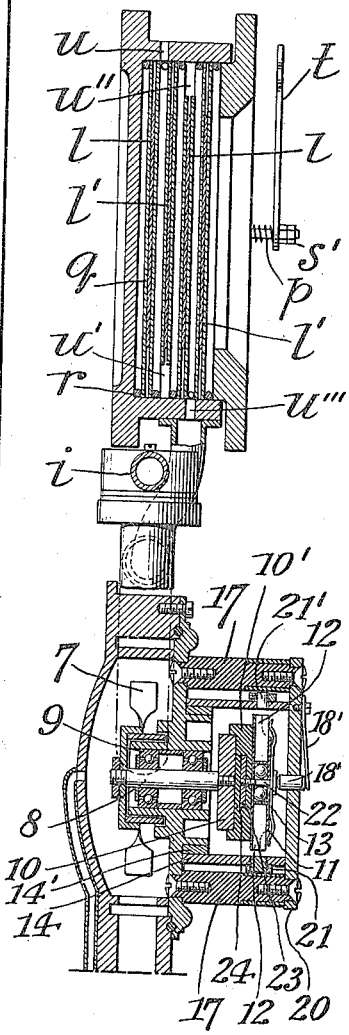

L. H. E. BÉGOT.
APPARATUS FOR STERILIZING WATER BY MEANS OF OZONE.
APPLICATION FILED AUG. 3, 1916.
1,264,360.
Patented Apr. 30, 1918.
5 SHEETS—SHEET 3.
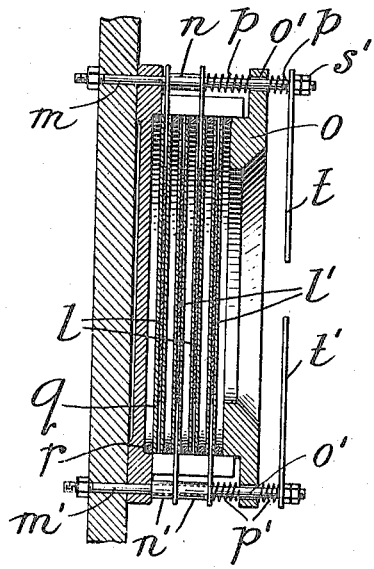
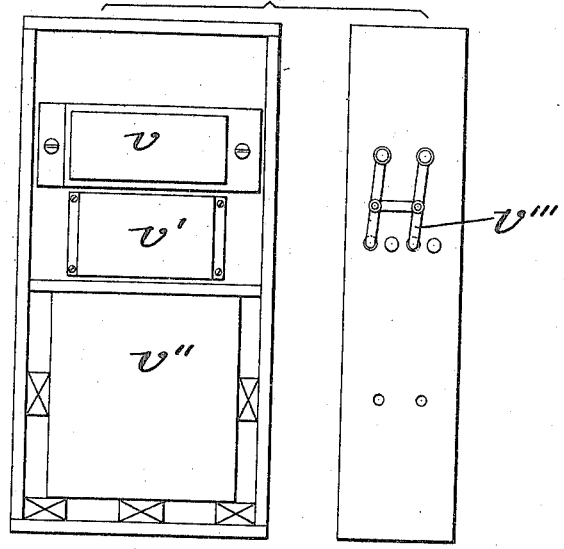
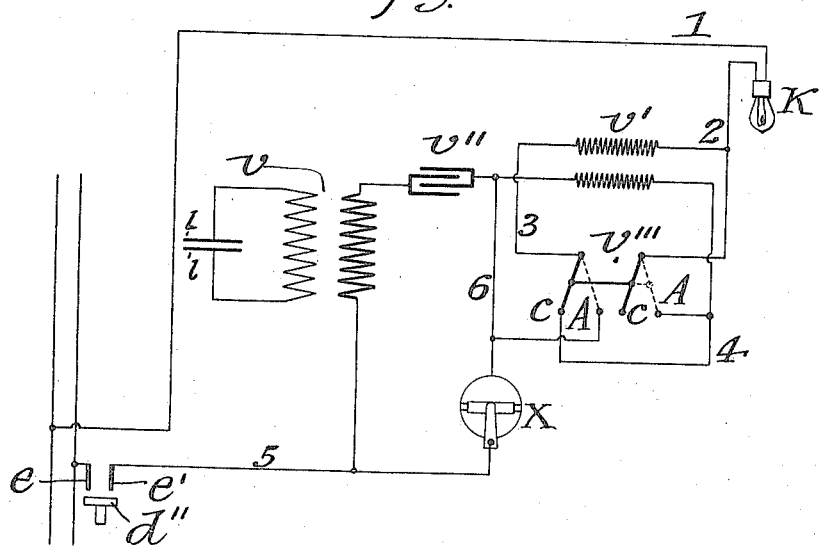
Inventor
Louis H. E. Bégot
By his Attorneys

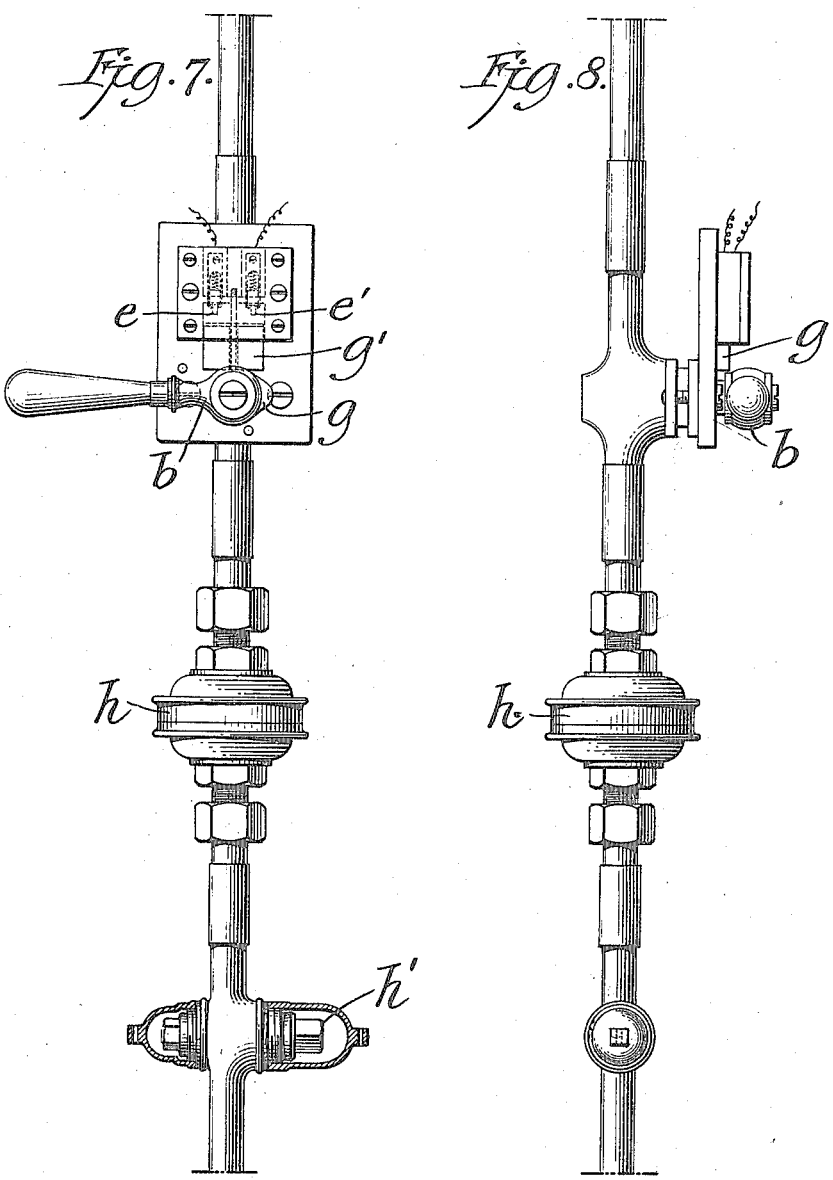

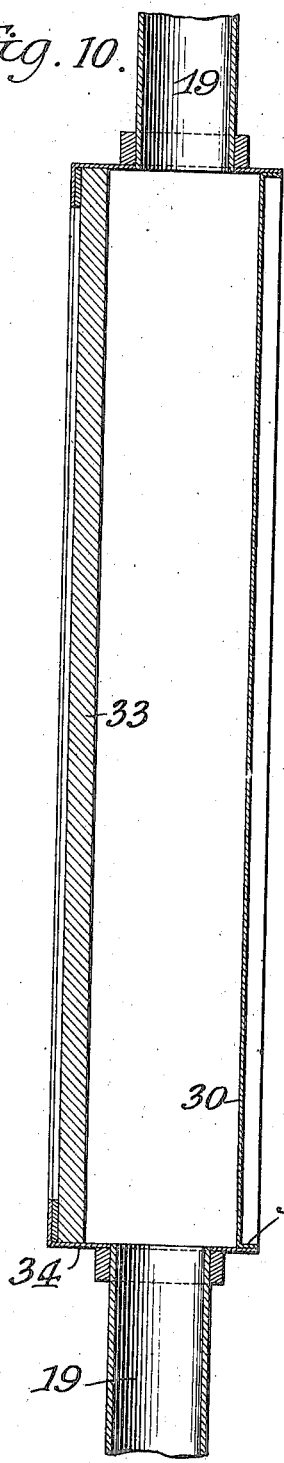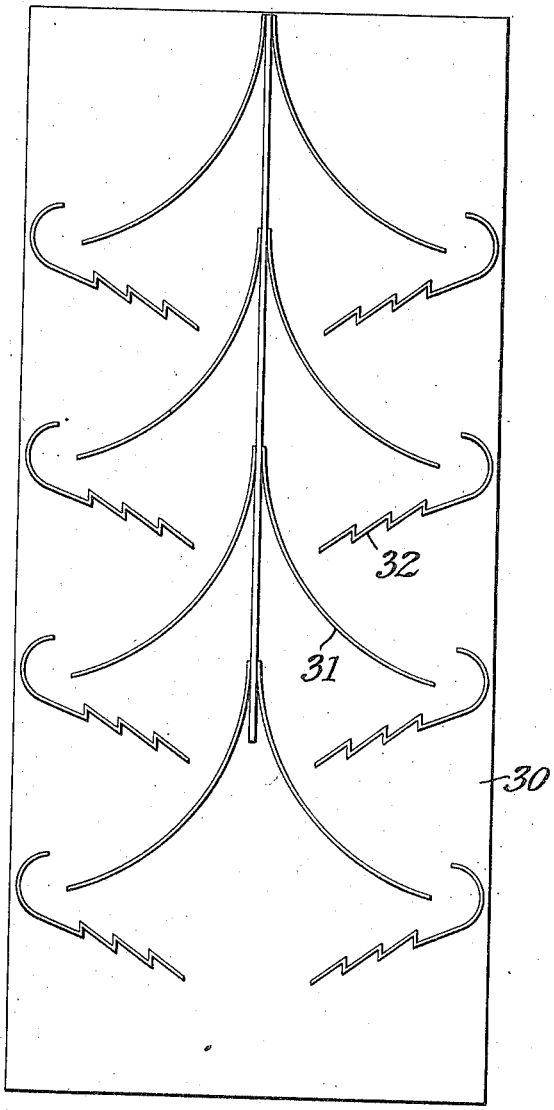

UNITED STATES PATENT OFFICE.

LOUIS HIPPOLYTE EDMOND BÉGOT, OF PARIS, FRANCE, ASSIGNOR, BY MESNE ASSIGNMENTS, TO STEYNIS OZONE COMPANY, A CORPORATION OF NEW YORK.

APPARATUS FOR STERILIZING WATER BY MEANS OF OZONE.

1,264,360.   Specification of Letters Patent.   Patented Apr. 30, 1918.

Application filed August 3, 1916. Serial No. 112,910.

*To all whom it may concern:*

Be it known that I, LOUIS HIPPOLYTE EDMOND BÉGOT, a citizen of the Republic of France, residing at 192 Rue de Vaugirard, Paris, France, have invented certain new and useful Improvements in Apparatus for Sterilizing Water by Means of Ozone, of which the following is a disclosure.

My invention relates to combined apparatus for ozonizing air and sterilizing water and is particularly adapted for use in homes, institutions, etc., where comparatively small plants, requiring a minimum amount of attention, are desired.

The object of my invention is to provide apparatus of this kind that will be reliable in operation, comparatively simple and inexpensive to construct and which will give an instantaneous flow of sterilized water and which can be put into and out of operation by merely opening and closing a water cock. With these objects in view my invention comprises means for ozonizing air, means for mixing the ozonized air with the water to be sterilized, a cock controlling the delivery of sterilized water, means whereby the opening of the cock will start the apparatus, and other detail features which I will hereinafter describe.

The preferred embodiment of my invention is illustrated in the accompanying drawings, in which—

Figure 1 is a front view of the complete apparatus except the sterilizing chamber;

Fig. 2 is a vertical section of the apparatus shown in Fig. 1;

Fig. 3 is a vertical transverse section of the ozone generator, water motor and associated parts shown in Fig. 1;

Fig. 4 is a horizontal section through the ozone generator taken on a plane perpendicular to that of Fig. 3;

Fig. 5 is a diagrammatic illustration of the positions of the electric devices in the containing box;

Fig. 6 is a wiring diagram of the electric connections;

Figs. 7 and 8 show a modification of the means shown in the other figures for closing the electric circuit;

Fig. 9 is a front view of the sterilizing chamber containing partitions or baffles whereby intimate contact between the water to be sterilized and the ozonized air is insured;

Fig. 10 is a vertical section of the sterilizing chamber shown in Fig. 9;

Fig. 11 is a front view, drawn to a reduced scale, illustrating the assembled apparatus complete;

Fig. 12 is a side view of the apparatus shown in Fig. 11.

Referring in detail to the drawings, the apparatus is connected to the water mains through a pipe $a$, provided with a stop cock $b$. When the latter is opened, water flows through conduit $c'$ into the transverse canal $c$ arranged on the lower side of block $c''$ and piston $d$ formed of a pressed leather disk is subjected to the pressure of the water. Above the piston $d$ there is an insulating block $d'$ above which is fixed a metallic disk $d''$. When the piston $d$ is raised by the water the disk or plate $d''$ will close the circuit of the generator by electrically connecting contacts $e$ and $e'$. This circuit-closing arrangement actuated by the pressure of the water has the advantage that it permits the passage of the electric current into the installation only when the latter is traversed by water to be sterilized.

Figs. 7 and 8 show a modified arrangement for simultaneously turning on and off the water and electric current. In this arrangement the cock $b$ is provided with a projecting end $g$ so disposed that when the cock is turned to turn on the water it raises the member $g'$ and closes the gap between the terminals $e\ e'$, thus closing the electric circuit. $h$ represents a filter which may be employed to remove coarse matter from the water. $h'$ is an auxiliary cock for shutting off the water.

The water flows through conduit $c'$ into pipe $i$ after having passed a regulating cock $j$, and reaches the injector $i'$, which by aspiration or suction draws in the ozonized air through tube $i''$. The water then acts on the vanes 7 of the water turbine, or motor, which, in turn, rotates the interrupter mounted on shaft 8, a description of which will be given below.

The water, mixed with the sterilizing agent, that is, the ozonated air, after having acted upon the vanes 7 of the turbines, leaves the turbine casing through pipe 19, except that a portion of the water is carried beyond the entrance to pipe 19 by centrifugal action; and if this water were left in the turbine chamber it would tend to set up a counter pressure or reaction with the consequence that the rotation of the turbine would thereby be reduced. To obviate this, such water as is carried by the entrance to pipe 19 by centrifugal force, is forced up behind the partition 7', rises within space 7'' and reënters the chamber, without pressure, through orifice 7''', running along the inside wall of the chamber and becoming eventually mixed with the water escaping through conduit 19.

The lower end of conduit 19 is narrowed or tapered at $j$ and terminates in chamber $j'$, where it forms a second water injector operating through tube 19' to relieve any excess of pressure inside the casing or turbine 7. The water and ozonized air flow from the injector into the sterilizing chamber 30ª, then out through the discharge pipe 19''.

If the vessel to be filled with sterilized water is so contracted around the end 19'' as to prevent the air escaping or the end 19'' is permitted to extend into the liquid, there will be a backing up of the liquid in the apparatus. To prevent this happening an orifice is placed in the wall of the chamber $j'$, which is closed under normal conditions by a spherical valve $j''$ of the pendular type and which is held down only by its weight. The arrangement is such that if the liquid should rise in the apparatus, it will be impossible for the motor or generator to be flooded because the water will flow through the orifice in box $j'$ by raising the spherical valve $j''$.

It will be seen from the foregoing that auxiliary injector $j'$ has two distinct functions,—(1) it prevents counter pressures or reactions in the turbine casing by sucking off any excess of ozonated air, this excess of ozonated air being utilized for sterilizing purposes by being brought in contact with water previously treated; and (2) it prevents any water rising in the system and flooding the apparatus.

The ozone generator proper is formed of insulating laminæ $q$, constituting dielectric elements interposed between the conducting laminations $l$ between which silent discharges pass. The conducting layers $l$ are preferably made of metallic tissue and terminate in tail pieces having holes through which the pins $m$ and $m'$ pass. These pins constitute the two terminals by which current is supplied to the electrodes. The sleeves $n$ and $n'$ on the pins $m$ $m'$ serve to maintain the proper distance between plates $l$ and $l'$. The rings $r$ of insulating material operate to space the dielectric plates from each other. Spark terminals $t$ and $t'$ are mounted on the pins $m$ and $m'$ and are so disposed as to permit discharges passing between them in case the potential has a tendency to rise to such an extent as to damage the apparatus. The cover $o$ is mounted so as to hold the electrodes and dielectric plates in position. The nuts $s$ and $s'$ operate in connection with the springs $p$ and $p'$ to hold the cover and plates of the generator in position. The dielectric elements $q$ are provided with openings arranged to permit the circulation of the air to be ozonized. The air enters at $u$ (Fig. 3), circulates across the plates by passing through openings $u'$ and $u''$, and leaves through orifice $u'''$.

The electrical apparatus required to operate the ozonizer is assembled in a suitable box or frame (see Fig. 5). It comprises a transformer $v$; inductance or loading coils $v'$, condensers $v''$ and switch $v'''$ all connected and arranged as shown in the diagram of electrical connections, Fig. 6. Referring to this figure it will be seen that the switch $d''$, $e$, $e'$, actuated either by the pressure of the water or else by the cock, as above described, is placed in one lead of the local supply circuit, the latter comprising the indicator lamp K, reactance coils $v'$, condenser $v''$, transformer $v$ and switch $v'''$ for connecting the circuits for continuous or alternating current, and finally the rotating interrupter X.

As shown, the switch $v'''$ is set for operation with continuous current, and the current coming in over wire 1, traverses lamp K, goes through wire 2 into inductance $v'$ and through wire 3, switch $v'''$ and wire 4. It then goes to the second inductance $v'$ and, after traversing the same, goes to the condenser $v''$, thence to the primary circuit of the transformer and finally into return lead 5. The foregoing description is made on the assumption that the rotating interrupter or breaker is on an insulating contact; when it is on a conducting contact a short circuit is produced by wire 6 and the interrupter through which the primary of the transformer discharges. If the apparatus is connected with an electric main carrying alternating current, the arms of switch $v'''$ are on contacts A and the coils $v'$ are connected in parallel in lieu of in series, and the operation is otherwise the same.

I will now describe rotating breaker or interrupter $x$ which, as illustrated in Fig. 3, is mounted on the shaft of turbine 7.

Shaft 8 of turbine 7 is supported on ball bearing 9, and carries, at 10, a metal plate to which a disk 10' is secured. This disk is made of ebonite or some other insulating material and on its inner face there is placed a small metal plate 23 insulated from the disk 10 by the ebonite disk 24. The shaft 22 is screwed into the plate 23 and carries a brush-holder 11. The shaft 8, by its rotary motion, drives shaft 22, which, in turn, rotates the brush-holders 11 and the brushes 12. Shaft 22 is electrically connected with the brush-holder and thereby with the brushes, the current being led to this shaft through the spring contact 18'. Due to the centrifugal action the brushes 12 pushed by balls 13 are forced against the inside wall of cylindrical box 14 press-fitted around cylindrical part 14'. On the inside wall of cylindrical box 14 and opposite brushes 12 are placed contacts 21 and 21', which are alternately insulating and conducting. Hence the rotation of brushes 12 produces an alternate closing and opening of the electric circuit. The columns 17 serve to support a bar 20 on which the spring contact 18'' is placed.

The brushes, due to their friction with the insulating contacts (which are made of fibrous material) become impregnated with fiber whereby naturally their contact with the metallic contacts is impaired. In order to remedy this, one of the contacts 21', over which the brushes wipe, is made of emery, corundum or some other abrasive material adapted to clean the brushes as they rotate.

The duration of contact between the ozonated air and the water to be sterilized is, as is well known, an essential factor in the operation of a device of this kind. In the apparatus above described, the water to be sterilized is mixed with the ozonized air in turbine 7, which is sufficient to sterilize good filtered water. In practice, however, the duration of contact may be lengthened by mounting one or a plurality of baffle boxes or sterilizing chambers 30ª between the generator and the discharge orifice 19''.

These, as indicated in Figs. 9 and 10, are formed of a metallic plate 30 on which baffles 31 and 32 are soldered; the whole is then placed inside a box 34 to which the ends of tube 19 for the circulation of water and ozonized air are soldered. The front face of the box is formed of a glass piece 33 through which the circulation of the water inside the box may be observed. To finish the mounting the bent-over part 30' of bottom 30 is soldered flat onto the frame of the box 32.

The operation of my improved device will be obvious from the foregoing description. It will also be obvious that modifications and changes may be made in the preferred embodiment described above without departing from the scope of my claims.

What I claim is:

1. The combination in a device of the kind described of an ozone generator, an injector operated by water to be sterilized to draw air through the generator, a water motor also operated by the said water, an electric circuit arranged to supply current to said generator and a rotating contact in said circuit and arranged to be driven by said water motor.

2. The combination in a device of the kind described of an ozone generator, an injector operated by the water to be sterilized and arranged to draw air through the generator, a turbine arranged to be driven by the water flowing from the said injector and operating to produce a mixture of ozonized air and water and a second injector arranged to draw air from the turbine casing.

3. The combination in a device of the kind described, of an ozone generator, an injector arranged to draw air through the generator, a turbine driven by the water to be sterilized and operating to produce a mixture of ozonized air and water, an electric circuit connected to the generator comprising a rotating contact driven by said turbine, a second injector arranged to remove air from the turbine casing and a sterilizing chamber arranged to receive the water and air, all substantially as described.

4. The combination in a device of the kind described, of an ozone generator, an injector operating by the water to be sterilized to draw air through the generator, a water motor arranged to be driven by said water, an electric circuit arranged to supply current to said generator, a rotary contact in said circuit and driven by said motor, a pipe connecting the apparatus with a supply of water to be sterilized and a switch in said electric circuit arranged to be closed and held in closed relation by the water circulating in the pipe.

5. The combination in a device of the kind described, of an ozone generator, an injector operated by the water to be sterilized and arranged to draw air through the generator, a turbine arranged to be driven by the water flowing from the said injector and operating to produce a mixture of ozonized air and water and a second injector arranged to draw air from the turbine casing and provided with an overflow orifice closed by a valve opening outwardly.

6. The combination in a device of the kind described, of an ozone generator, a turbine, means for conducting the ozonized air from the generator into the chamber of the turbine, a water supply pipe arranged to deliver the water to be sterilized into the turbine, an electric circuit connected to said generator comprising a switch consisting of two fixed terminals and a movable bridge piece adapted to be brought into closed position by the pressure of the water in the water supply pipe.

7. In a device of the kind described, a water turbine arranged and adapted to mix water to be sterilized with ozonized air, a discharge conduit for water and air leading therefrom, an injector located therein and a second conduit leading from the injector to the turbine for relieving pressure in the turbine.

8. The combination with a water pipe of an air injector arranged to receive water from said pipe, an ozone generator, said injector receiving air from said ozone generator, a motor connected to said pipe in series with said injector, and a source of electricity for exciting said ozone generator comprising a member operated by said motor.

LOUIS HIPPOLYTE EDMOND BÉGOT.

Copies of this patent may be obtained for five cents each, by addressing the "Commissioner of Patents, Washington, D. C."